J. CLARRIDGE.
COTTON-SEED PLANTER.

No. 186,800. Patented Jan. 30, 1877.

Witnesses:
Cha.s M. Peck
W.m Ritchie

Inventor:
John Clarridge
by his Atty's.
Peck & Co.

UNITED STATES PATENT OFFICE.

JOHN CLARRIDGE, OF MOUNT STERLING, OHIO.

IMPROVEMENT IN COTTON-SEED PLANTERS.

Specification forming part of Letters Patent No. 186,800, dated January 30, 1877; application filed December 16, 1876.

*To all whom it may concern:*

Be it known that I, JOHN CLARRIDGE, of Mount Sterling, in the county of Madison and State of Ohio, have invented certain new and useful Improvements in Cotton-Seed Planters; and I do hereby declare the following to be a full, clear, and exact description of the same.

This invention relates to certain improvements in cotton-seed planters.

These improvements consist in the novel application of a blast-fan so arranged upon the frame-work and so connected that the blast disengages the seed-fibers from the teeth of an endless revolving apron, and conveys them through the shovel-standard into the furrows made for their reception; also, in the application and arrangement of an adjustable colter, all as will be herewith described, and my invention distinctly pointed out in the claims.

To enable others skilled in the art to which my invention appertains, to make and use the same, I would thus proceed to describe its construction and operation, referring throughout to the accompanying drawings, in which—

Figure 1:
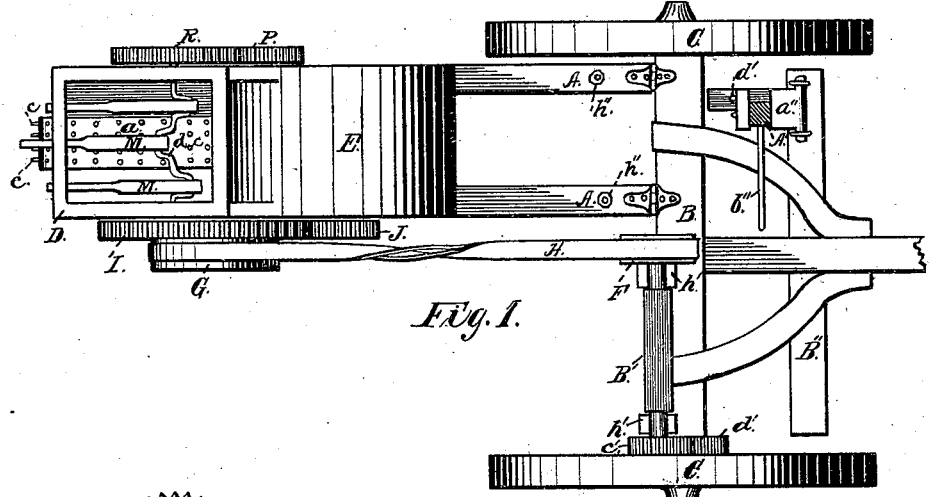
Figure 2:
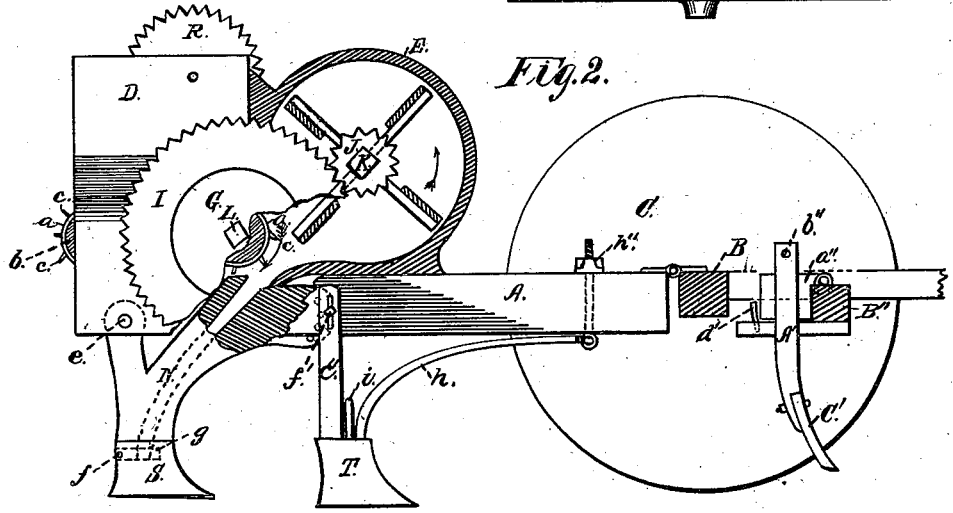
Figure 3:
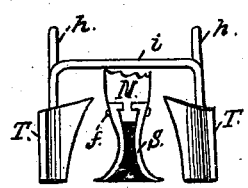

Figure 1 is a plan view of my improved cotton-seed planter. Fig. 2 is a side elevation of the same, with portions broken to show the operating devices. Fig. 3 is a rear view of the plows, indicating their relative positions.

Corresponding letters of reference indicate like parts in all the figures.

Two parallel beams, A, are hinged at their forward ends to an axle, B, upon the ends of which revolve the supporting-wheels C. Upon the rear ends of these beams is fastened the seed box or hopper D. E is an ordinary blast-fan secured upon the same beams just in front of this hopper.

Motion is communicated to the fan by a pulley, F, keyed upon the end of a shaft, $B^1$, and connected to the pulley G by means of a belt, H. A gear-wheel, I, upon the same shaft L as the pulley G, engages with the smaller gear-wheel J that is secured upon the fan-shaft K. The shaft L passes transversely under the bottom of the hopper, and turns the endless apron $a$, whose upper side is confined in a slot in the bottom of the hopper, while its under side passes over a pulley, $b$, at the rear of the hopper and under its bottom. This apron is provided with equidistant transverse rows of teeth $c$ that receive the seed-fibers from the pickers M and convey them into the aperture over the standard-chute, where they receive the full action of the blast, which disengages them from the belt, and conveys them to the ground through the standard N. This is clearly illustrated in Fig. 2, which shows in section the relative positions of the fan-outlet, the endless apron, and the passage-way of the standard.

The seed-fibers are separated in the hopper by reciprocating pickers M, arranged as shown upon a zigzag crank, $d$, journaled in the hopper near its top, and receiving motion from the shaft L by means of the gear-wheels P and R. The standard N is of the shape represented, being pivoted at $e$, and held at its forward end by a break-pin used with various adjusting-holes for regulating the pitch of the plow in the usual manner. The shaft $B'$ is supported in journals $h'$ upon the axle B, and has at its outer end a gear-wheel, $c'$, that engages with a similar wheel, $d'$, attached to, and revolving with, the supporting-wheel C.

The plow S is secured upon the bottom of the standard in the usual or any convenient manner. T represents two shovel-plows, situated one on each side and just in front of the plow S, and connected to the beams A by curved rods $h$, and to each other by the rod $i$.

These plows serve to throw up a ridge on each side of the furrow made by the plow S, and their pitch is regulated by a bar, $c''$, bolted to each plow and extending up into a mortise in the beams, at which point a set-screw, $f'$, passing through a slot in the ends of the bars and into the beams, would serve to hold the plows in any desired position. The rods $h$ are bent upward at their ends, and pass through the beams A. Nuts $h''$, screwed upon their ends, hold them in place and allow them to be adjusted up or down to aid in regulating the pitch of the plows T.

The remaining novel feature of my invention consists of the standard $A'$ in a line with the plow S, and pivoted in the bearing $a''$, which last is pivoted, as represented, to the cross-beam $B''$. This standard, by means of its handle $b''$, can be turned sidewise to discharge the weeds and vines collected by the colter C', which is bolted to it, as seen. In place of the colter an ordinary marking or scoring plow may be used.

A break-pin, $d'$, holds the bearing $a''$ in place; but in meeting with any rigid obstacle, breaks, and allows the bearing with the standard to swing back and pass safely.

Having thus fully described my invention, what I claim as new, and desire to secure by Letters Patent, is as follows:

1. The combination, with a cotton-seed planter, of a blast-fan, E, arranged in the manner and for the purpose specified.

2. The adjustable swinging standard A' in its bearing $a''$, pivoted and arranged upon the forward beam B'', in connection with a break-pin, all as and for the purpose specified.

Witness my hand this 28th day of January, A. D. 1876.

JOHN CLARRIDGE.

Witnesses:
CHAS. M. PECK,
WM. RITCHIE.